US011278845B2

(12) United States Patent
Piesker

(10) Patent No.: US 11,278,845 B2
(45) Date of Patent: Mar. 22, 2022

(54) GAS DEHUMIDIFICATION DEVICE AND TRANSPORT MEANS HAVING A GAS DEHUMIDIFICATION DEVICE

(71) Applicant: Airbus Operations GmbH, Hamburg (DE)

(72) Inventor: Markus Piesker, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 285 days.

(21) Appl. No.: 16/439,145

(22) Filed: Jun. 12, 2019

(65) Prior Publication Data

US 2019/0381451 A1 Dec. 19, 2019

(30) Foreign Application Priority Data

Jun. 15, 2018 (DE) .................... 10 2018 114 352.4

(51) Int. Cl.
*B01D 53/26* (2006.01)
*F24F 3/14* (2006.01)

(52) U.S. Cl.
CPC .............. *B01D 53/265* (2013.01); *F24F 3/14* (2013.01); *F24F 2003/1446* (2013.01)

(58) Field of Classification Search
CPC .. B01D 53/265; F24F 3/14; F24F 2003/1446; F24F 2003/144; E03B 3/28; F28D 2021/008; F28D 2021/0021; F28D 2021/0043; F28D 2021/0038; F28D 7/106; F28D 7/0066; F28D 7/10; B60H 3/024; B64D 13/06; B64D 2013/0662
See application file for complete search history.

(56) References Cited

U.S. PATENT DOCUMENTS

| 4,905,476 A | * | 3/1990 | Cinacchi | .............. | B01D 53/265 |
| | | | | | 62/198 |
| 6,523,359 B1 | * | 2/2003 | Posch | ..................... | F24F 3/153 |
| | | | | | 62/173 |

(Continued)

FOREIGN PATENT DOCUMENTS

| DE | 1960953 A | 12/1970 |
| DE | 102016100192 A1 | 7/2017 |

OTHER PUBLICATIONS

German Search Report; priority document.
European Search Report for corresponding European Patent Application No. 19178806 dated Oct. 10, 2019.

*Primary Examiner* — Kun Kai Ma
(74) *Attorney, Agent, or Firm* — Greer, Burns & Crain, Ltd.

(57) ABSTRACT

A gas dehumidification device having two heat exchangers, each including a first and second fluid line. Each second fluid line at least partially surrounds the respective first fluid line. Each heat exchanger thermally couples a fluid in the respective heat exchanger second fluid line with a first coolant on an outside surface of the respective heat exchanger second fluid line. The gas dehumidification device further comprises a two-position valve. In a first position, a fluid comprising a higher temperature than the first and/or second coolant is conducted into the first heat exchanger first fluid line and in the second position, the fluid is conducted into the second heat exchanger first fluid line. A controller is configured to place the valve selectively into the first or second position.

16 Claims, 5 Drawing Sheets

(56) References Cited

U.S. PATENT DOCUMENTS

| | | | | |
|---|---|---|---|---|
| 6,666,040 B1* | 12/2003 | Groenewold | ........... | F24F 3/153 |
| | | | | 62/173 |
| 9,346,336 B2* | 5/2016 | Graaf | ................. | B60H 1/00007 |
| 2003/0205055 A1* | 11/2003 | Shahbaz | ............... | F24F 5/0096 |
| | | | | 62/331 |
| 2013/0160478 A1* | 6/2013 | Kontomaris | ............ | F24V 99/00 |
| | | | | 62/324.1 |
| 2013/0292101 A1* | 11/2013 | Denoual | ................ | F28D 9/005 |
| | | | | 165/166 |
| 2015/0007594 A1* | 1/2015 | Laufer | .................... | F28D 7/106 |
| | | | | 62/113 |
| 2016/0244651 A1* | 8/2016 | Leck | ....................... | C09K 5/045 |
| 2017/0275514 A1* | 9/2017 | Kontomaris | ............ | F25B 30/02 |
| 2017/0328589 A1* | 11/2017 | Fimeri | ................... | F24F 3/153 |
| 2018/0134124 A1* | 5/2018 | Kozasa | ................ | B60H 1/3202 |

* cited by examiner

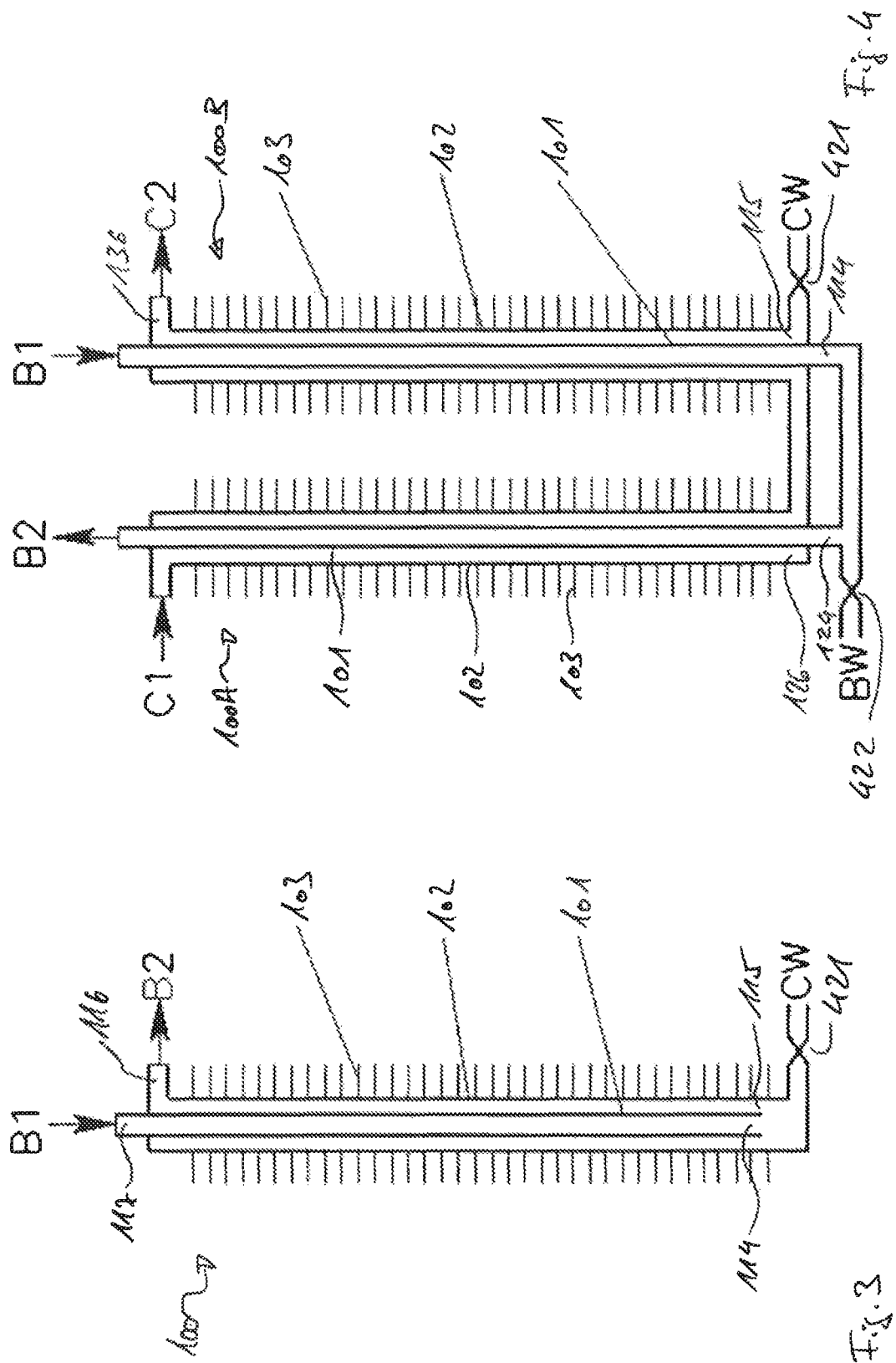

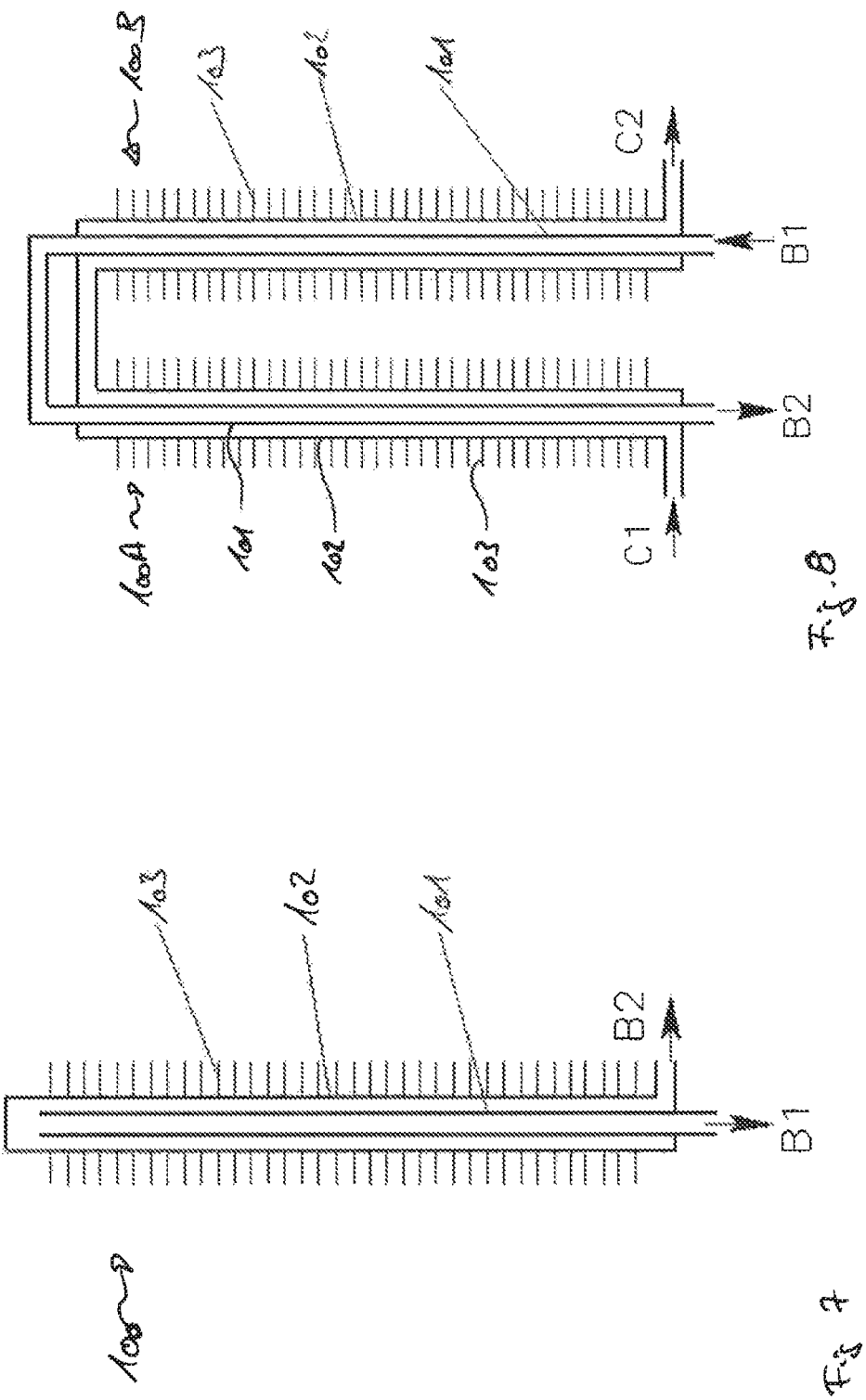

GAS DEHUMIDIFICATION DEVICE AND TRANSPORT MEANS HAVING A GAS DEHUMIDIFICATION DEVICE

CROSS-REFERENCES TO RELATED APPLICATIONS

This application claims the benefit of the German patent application No. 10 2018 114 352.4 filed on Jun. 15, 2018, the entire disclosures of which are incorporated herein by way of reference.

FIELD OF THE INVENTION

The invention relates to a gas dehumidification device selectively supplying a hot fluid into a first or second heat exchanger and relates further to a transport means having such a gas dehumidification device. In particular, the invention relates to a gas dehumidification device, where the hot fluid is conducted into the first or second heat exchanger in order to defrost a region of the heat exchanger, while the other of the first or second heat exchangers is used for gas dehumidification, as well as to a correspondingly equipped transport means, such as an airplane.

BACKGROUND OF THE INVENTION

Gases which have to have a particularly high degree of dryness, i.e., in which the gases have a very low water content (ideally a water content equal to zero), are used in many applications. For example, the gas (H2 and O2) supplied to a fuel cell has to be dehumidified in order to attain a high degree of efficiency of the fuel cell.

Where gases are dried or dehumidified, the temperature of the gas is lowered so that it drops below the dew point of water. In this case, the water contained in the gas can be separated off as condensate. The lower the temperature is reduced, the drier the gas becomes. The gas is cooled by means of a corresponding heat exchanger which draws thermal energy from the gas.

In order to attain a high degree of drying quality in gases, the corresponding gas has to be cooled below the freezing point of water. However, this results in the condensed water freezing in the heat exchanger, for example on a cold wall of the heat exchanger or in the form of ice crystals which are separated from the gas. The ice formation cannot be prevented insofar as a high degree of drying quality has to be attained but it brings about an increasing constriction of the flow cross section of the heat exchanger (as a result of ice crystals being deposited) and/or reduces the performance of the heat exchanger as a result of the growing layer of ice on the walls of the heat exchanger.

The removal of the ice from the heat exchanger is effected in the majority of cases by heating the heat exchanger. A cooling air flow can thus be replaced, for example, by a hot air flow which heats the wall of the heat exchanger on which a layer of ice has formed so that the ice is melted. In this phase, however, the heat exchanger is not able to be used to dehumidify the gas.

SUMMARY OF THE INVENTION

An object underlying the invention, thus, is to provide a gas dehumidification device which enables a gas flow to be dried continuously in an efficient and cost-effective manner, and a transport means with such a gas dehumidification device.

According to a first aspect, a gas dehumidification device comprises a first heat exchanger which includes a first fluid line and a second fluid line, wherein the second fluid line surrounds the first fluid line at least in portions, and a second heat exchanger which includes a first fluid line and a second fluid line, wherein the second fluid line surrounds the first fluid line at least in portions. In other words, at least one portion of the first fluid line is arranged inside the second fluid line and part of the second fluid line encases the at least one portion of the first fluid line.

The fluid flowing in the first fluid line can be any arbitrary liquid or any arbitrary gas. The fluid is capable of transporting thermal energy and of discharging it via the material of the first fluid line to the fluid in the second fluid line.

In addition, the first heat exchanger can be configured to thermally couple a fluid located in the second fluid line of the first heat exchanger with a first coolant on an outside surface of the second fluid line of the first heat exchanger. The thermal coupling can be arranged in a simple manner in that the first coolant touches the outside surface of the second fluid line and/or flows over it so that the coolant is able to absorb thermal energy from the material of the second fluid line and, in this case, cools the second fluid line. Correspondingly, the second fluid line absorbs thermal energy from the fluid located in the second fluid line of the first heat exchanger so that a thermal coupling is achieved between fluid and coolant.

The fluid flowing in the second fluid line can be any arbitrary gas which has to be dehumidified. The fluid can obviously also be a liquid which contains water which crystallizes as a result of cooling of the fluid (formation of ice) and, as a result, is able to be removed from the fluid flowing in the second fluid line. For this purpose filters, which filter out the ice crystals, and/or water separators in order to separate off condensation water or melt water, can be provided.

The second heat exchanger can also be configured to thermally couple a fluid located in the second fluid line of the second heat exchanger with a second coolant on an outside surface of the second fluid line of the second heat exchanger. The thermal coupling is effected here in the same way as in the case of the first heat exchanger.

In a design variant, the first heat exchanger and/or the second heat exchanger comprises cooling ribs or other projections on the outside surface of the respective second fluid line in order to enlarge the surface of the outside of the respective second fluid line and consequently the surface in contact with the respective coolant.

In a further design variant, the first heat exchanger and/or the second heat exchanger comprises cooling ribs or other projections on the outside surface of the respective first fluid line and/or on the inside surface of the respective second fluid line. For example, spacer plates or spacers can also be arranged in the region between the outside surface of the respective first fluid line and the inside surface of the respective second fluid line. The spacer plates or spacers increase the stability of the respective heat exchanger, in particular in the case of long fluid lines, and can also be utilized as mounting aids. The cooling ribs, projections, spacer plates and/or spacers generate vortices and/or turbulence in the fluid flowing through the respective second fluid line, as a result of which the thermal transmission between the respective first fluid line and fluid flowing through the respective second fluid line or between the respective second fluid line and fluid flowing through the respective second fluid line is increased. As an option, the cooling ribs and/or other projections can be arranged both on the respective first fluid line and on the respective second fluid line, but in each case, only on one of the two fluid lines. In other words, the cooling ribs and/or other projections of the first fluid line are not connected to those of the second fluid line. Such a heat exchanger, irrespective of whether it comprises cooling ribs, projections, spacer plates and/or spacers arranged on the first fluid line or the second fluid line or on both fluid lines, is able to be produced in a simple and cost-efficient manner as a result of a 3D printing process, for example by means of an ALM process (additive layer manufacturing). In addition, arbitrary contours of the fluid lines and/or of the cooling ribs, projections, spacer plates and/or spacers are able to be produced using an ALM process.

In addition, the gas dehumidification device can comprise a valve which is able to assume two positions. In this case, in a first of the two positions a fluid which comprises a higher temperature than the first and/or second coolant can be conducted into the first fluid line of the first heat exchanger and in a second of the two positions of the valve, the fluid can be conducted into the first fluid line of the second heat exchanger. The valve can be arranged, for example, in a general fluid line and can direct a fluid flowing in the general fluid line either to the first heat exchanger or the second heat exchanger, and, in particular, to the respective first fluid line of the first or second heat exchanger.

Finally, the gas dehumidification device can include a controller which is configured to move the valve selectively into the first or second position. As a result of the controller and the valve, a fluid can be selectively conducted into the first heat exchanger or the second heat exchanger which has a higher temperature than the first and/or second coolant. This enables the corresponding heat exchanger to be warmed up (heated) from the inside out. As a result of introducing the hotter fluid into the respective first fluid line of the first or second heat exchanger, the first fluid line outputs thermal energy to the fluid contained in the second fluid line. Ice possibly contained in the second fluid line (crystallized fluid) is melted as a result and the respective heat exchanger can be defrosted. The temperature of the fluid conducted into the first fluid line by means of the valve can be a temperature which is above the freezing point of the fluid located in the second fluid line. As a result, rapid defrosting of the corresponding heat exchanger can be made possible.

Respective fluid lines are provided between the valve and the first and second heat exchangers. As an alternative to this, the first and second heat exchangers are arranged in such a manner that the valve can be connected directly to the respective first fluid line of the first and second heat exchangers. As a result, loss of thermal energy in the fluid introduced into the respective first fluid line can be reduced and the defrosting of the respective heat exchanger accelerated.

The first and second fluid lines of each of the first and second heat exchangers can comprise an arbitrary cross sectional form. The first and second fluid lines can thus each have a circular cross section, the second fluid line having a larger diameter than the first fluid line. A circular cross section offers the greatest stability with reference to a pressure acting on the first and second fluid lines. In addition to this or as an alternative to it, at least one of the first and second fluid lines of at least one of the first and second heat exchangers can have a different cross sectional form, for example an elliptical form, a rectangular form, a square form or a polygonal form. The respective cross sectional form can be symmetrical or can comprise an arbitrary asymmetrical form. By selecting the cross sectional form in a corresponding manner, it is possible to determine a surface for the respective fluid line which promotes a defrosting of the respective heat exchanger. For example, a cross sectional form of one of the second fluid lines with as few corners as possible (optimally elliptical or circular) or as few changes in the curvature as possible prevents the formation of niches which, after freezing, are not easy to reach by the thermal energy of the fluid conducted into the first fluid line and can consequently be less well defrosted. On the other hand, a cross sectional form of the second fluid line with corners and/or changes in curvature increases the area available for the thermal coupling with the respective coolant, as a result of which the fluid to be dehumidified is able to be better cooled and consequently better dehumidified. A cross sectional form with corners and/or changes in curvature is also suitable for the first fluid line in order to improve the thermal coupling between the fluid in the first fluid line with the fluid (ice) in the second fluid line.

As a result of the second fluid line of the first and second heat exchangers surrounding the first fluid line, the second fluid line comprises a larger surface than the first fluid line (at least in the region in which the second fluid line surrounds the first fluid line). This ensures that a thermal flow between the second fluid line and the coolant is greater than a thermal flow between the first fluid line and the fluid flowing in the second fluid line.

In a design variant, the gas dehumidification device can further comprise at least one conveying device for the first and/or second coolant. The conveying device can be implemented, for example, in the form of a pump, a compressor or a blower. The controller is further configured to convey the first coolant via the outside surface of the second fluid line of the first heat exchanger when the valve is placed into the second position, and of conveying the second coolant via the outside surface of the second fluid line of the second heat exchanger when the valve is placed into the first position. In other words, the controller can control the at least one conveying device in such a manner that the heat exchanger, which has to be defrosted, is not traversed by the coolant. As a result, the cooling of the fluid in the second fluid line and consequently a continuation of the icing is interrupted.

Furthermore, the controller can be configured to operate the conveying device in dependence on a temperature of the coolant. Thus, it can be switched between free convection (without operation of the conveying device) and forced convection (with operation of the conveying device) in dependence on the temperature of the coolant. In a design variant, the operation of the conveying device can also be controlled such that the conveying device is operated at the smallest possible output for free convection. As a result, fault-prone starting operations of the conveying device are avoided, as a result of which the reliability of the system is increased.

It is possible to dispense with the at least one conveying device depending on the temperature of the coolant and/or of the fluid which is conducted via the valve into the first fluid line. For example, it can be sufficient for defrosting the heat exchanger when the temperature of the fluid conducted into the first fluid line lies above the freezing point of the substance which is to be precipitated from the fluid (for example, water) flowing in the second fluid line as a result of cooling, (for example, more than 10 K, more than 20 K or more than 50 K above the freezing point of the fluid in the second fluid line). However, if the temperature of the coolant is (seriously) below the freezing point of the substance to be precipitated in the fluid in the second fluid line, a conveying device is possibly not necessary either. An additional removal of heated coolant is not necessary on account of a high temperature difference between the fluid in the second fluid line and the coolant. For example, it is possible to dispense with a conveying device for the coolant where a temperature of the coolant is less than 10 K, less than 20 K or less than 50 K below the freezing point of the substance to be precipitated in the fluid in the second fluid line.

Furthermore, it is possible to dimension the first and/or second heat exchangers, i.e., the size of the surface of the respective second fluid line and/or a size and arrangement of optional cooling ribs on the respective second fluid line, such that a frozen heat exchanger is able to be defrosted by shutting down a conveying device. On the other hand, temperatures in the fluid in the respective second fluid line (clearly) below the freezing point of the substance to be precipitated can be reached as a result of operating the conveying device. In other words, the coolant is moved either by forced convection (with the operation of the conveying device) or by free convection (without the operation of the conveying device). Obviously, the first and/or second heat exchanger can be dimensioned such that even completely without a conveying device, with free convection, the respective heat exchanger is suitable for dehumidifying a fluid flowing in the respective second fluid line and is able to be defrosted just by the hot fluid which flows through the respective first fluid line.

In a further design variant, an outlet of the first fluid line of the first heat exchanger can be fluidically coupled with an inlet of the second fluid line of the second heat exchanger. This allows the fluid introduced into the first fluid line of the first heat exchanger via the valve to cool in the second heat exchanger, and, in particular, in the second fluid line thereof. A gas to be dehumidified can consequently serve as a fluid which is introduced into the first fluid line of the first heat exchanger in order to defrost the first heat exchanger.

As an option, an outlet of the first fluid line of the second heat exchanger can be correspondingly fluidically coupled with an inlet of the second fluid line of the first heat exchanger. Here too, the fluid introduced into the first fluid line of the second heat exchanger via the valve is cooled in the first heat exchanger, and, in particular, in the second fluid line thereof. In this case, this can also be the gas to be dehumidified which is conducted by the controller and the valve selectively into the first fluid line of the first heat exchanger or the first fluid line of the second heat exchanger. The arrangement allows an alternate use of the first and second heat exchangers for dehumidifying the gas with simultaneous use of the gas to be dehumidified as a heat source for defrosting the heat exchanger which is currently not being used for dehumidification. In addition, the variant enables a gas dehumidification device which only requires a (changeover) valve and two of the heat exchangers described above. As a result, the gas dehumidification device is particularly simple in design, is easy to service and weighs less than conventional gas dehumidification devices, in particular those with an additional heating device.

In another design variant, an outlet of the first fluid line of the first heat exchanger can be fluidically coupled with an inlet of the second fluid line of the first heat exchanger. In this connection, the same fluid is conducted through the first and second fluid lines of the first heat exchanger one after another. For example, the outlet of the first fluid line and the inlet of the second fluid line coincide.

For example, an end of the first fluid line of the first heat exchanger, which forms the outlet of the first fluid line of the first heat exchanger, can be completely surrounded by the second fluid line of the first heat exchanger. This enables a reversal of a direction of flow of a fluid flowing through the first fluid line in a region of the second fluid line of the first heat exchanger formed by the inlet of the second fluid line of the first heat exchanger. After traversing the first fluid line and being redirected, the fluid flows in the reverse direction through the second fluid line.

As an alternative to this or in addition to it, an end of the first fluid line of the second heat exchanger, which forms the outlet of the first fluid line of the second heat exchanger, can be completely surrounded by the second fluid line of the second heat exchanger. This also enables a reversal of a direction of flow of a fluid flowing through the first fluid line in a region of the second fluid line of the second heat exchanger formed by the inlet of the second fluid line of the second heat exchanger. After traversing the first fluid line and being redirected, the fluid flows in the reverse direction through the second fluid line.

The design of the first and/or second heat exchanger enables the gas dehumidification device to be designed in a compact manner as the lengths of the first and second fluid lines of the respective heat exchanger can almost be the same size and the lengths determine the size of the gas dehumidification device in a significant manner A possible length difference consists simply in the connection at the inlet of the first fluid line, the reversing point between first and second fluid lines and/or in a connection at the outlet of the second fluid line. The predominant length of the first fluid line corresponds to that of the second fluid line as both fluid lines overlap in the region.

Equally as an alternative to this or in addition to it, an outlet of the second fluid line of the first heat exchanger can be fluidically coupled with an inlet of the first fluid line of the second heat exchanger. In other words, the first and second heat exchangers are connected in series.

For example, the first and second heat exchangers can be realized according to the above-described design variant, in which the outlet of the first fluid line is fluidically coupled with an inlet of the second fluid line of the same heat exchanger, and can be connected in series. Consequently, dehumidification of a gas can take place in the second heat exchanger while the gas to be dehumidified defrosts the first heat exchanger (in the direction of flow through the series-connected heat exchangers). In this connection, the gas, still hot in the second heat exchanger prior to the dehumidification, flows both through the first and the second fluid lines of the first heat exchanger, as a result of which rapid defrosting is obtained. In order then to defrost the second heat exchanger, which freezes during the dehumidification process, the hot gas is introduced into the second heat exchanger (in particular, the first fluid line thereof) as a result of switching over the valve. As a result of arranging a second valve, which can switch a fluidic coupling between the outlet of the second fluid line of the first heat exchanger with the inlet of the first fluid line of the second heat exchanger to a fluidic coupling of the outlet of the second fluid line of the second heat exchanger with the inlet of the first fluid line of the first heat exchanger, it is possible to set up a reverse series connection of the first and second heat exchangers. In this connection, the controller is additionally designed for the purpose of also controlling the second valve selectively such that the two heat exchangers are connected in series in the above-described manner in each of the two connection variants of the valves, i.e. always traversed from in to out (that is to say, once the first fluid line has been traversed, the second fluid line of the same heat exchanger is traversed).

In another design variant, an outlet of the second fluid line of the first heat exchanger can be fluidically coupled with an inlet of the second fluid line of the second heat exchanger. This enables the selective use of the first or second heat exchanger for dehumidifying the fluid flowing in the second fluid line of the respective heat exchanger. In this case, the gas to be dehumidified is conducted first of all through the second fluid line of the first heat exchanger and is then dehumidified in the second fluid line of the second heat exchanger. In order to defrost the latter, the direction of flow of the gas to be dehumidified is reversed, that is to say, conducted first of all into the second fluid line of the second heat exchanger and then into the second fluid line of the first heat exchanger, where the gas is dehumidified.

During the defrosting of the second heat exchanger, a fluid is conducted into the first fluid line of the second heat exchanger via the valve. As an option, a volume flow of a coolant, which flows over the outside surface of the second fluid line of the second heat exchanger, is delimited or completely stopped. For defrosting the first heat exchanger, the fluid is run into the first fluid line of the first heat exchanger via the valve and by means of the controller. Here too, as an option, a volume flow of a coolant for cooling the first heat exchanger can be delimited or stopped.

In a further design variant, an outlet of the first fluid line of the first heat exchanger can be fluidically coupled with an inlet of the first fluid line of the second heat exchanger. As a result, the fluid of the respectively first fluid line of the first or second heat exchanger, after traversing the associated heat exchanger, flows into the first fluid line of the respectively other heat exchanger. During the defrosting of the respective heat exchanger, the fluid absorbs thermal energy in the corresponding first fluid line so that in the first fluid line of the other heat exchanger, which it then traverses, it only produces a small amount of or absolutely no heating of the gas in the associated second fluid line. As a result, the dehumidification process already taking place there is not disturbed or is only disturbed a little. In particular, the smaller surface of the first fluid line in the second fluid line surrounding it compared to the larger surface of the second fluid line in relation to the coolant ensures sufficient cooling of the gas for dehumidification.

The fluid, which flows through the first fluid line, can be any arbitrary fluid as long as it has the necessary temperature for defrosting. For example, a liquid or a gas can be used. Obviously, the gas to be dehumidified can also be used before it is dehumidified or in another pressure state in which it has a higher temperature than prior to dehumidification.

In a further design variant, the first and second heat exchangers can be viewed as a unit, the unit being connected in series with a correspondingly identically equipped unit of two heat exchangers. For example, an outlet of the second fluid line of the second heat exchanger can be fluidically coupled with an inlet of a first fluid line of a third heat exchanger (of the second unit) and an outlet of a first fluid line of the third heat exchanger can be fluidically coupled with an inlet of the second fluid line of the first heat exchanger. As a result, the direction of flow of the gas and/or fluid through the first and second fluid lines of the first and second heat exchangers does not have to be changed.

According to a design variant, the gas dehumidification device can comprise a coolant channel. In this case, the first heat exchanger and/or the second heat exchanger can also be arranged in the coolant channel. This can be a ram air channel or another coolant channel through which a coolant flows without comprising a conveying device which is associated with the gas dehumidification device. As an option, the conveying device for the first and/or second coolant can be arranged in or at the coolant channel.

In a further design, the coolant channel can comprise, at least in one portion, an outer cylinder and an inner cylinder which is arranged concentrically in the outer cylinder. The outer cylinder and the inner cylinder form, in this case, an annular gap which forms the coolant channel portion. The annular gap can be connected to a further portion of the coolant channel which includes, for example, the conveying device.

Furthermore, the first heat exchanger can be formed in a helical manner and/or the second heat exchanger can be formed in a helical manner. The first heat exchanger and/or the second heat exchanger can thus be arranged in the annular gap formed by the outer cylinder and the inner cylinder. This allows the gas dehumidification device to be designed in a very compact manner.

According to a further variant, the outer cylinder and the inner cylinder can each be closed at a corresponding end face. In this case, the end face of the outer cylinder can be at a spacing from the corresponding end face of the inner cylinder. As a result, a further portion of the coolant channel will be formed between the two end faces. In addition, at least the outer cylinder can be open at a side located opposite the end face, and the annular gap formed by the outer cylinder and the inner cylinder can form a coolant inlet opening. Coolant can thus be conducted from the inlet opening through the annular gap via the heat exchanger/exchangers, the gas dehumidification device being compact and at the same time sturdy.

In yet another design variant, the gas dehumidification device can further comprise at least one first sensor, which is arranged in the first heat exchanger, and/or at least one second sensor which is arranged in the second heat exchanger. The sensor/sensors can be a temperature sensor, a pressure sensor, an infrared sensor, an image sensor or similar, by way of which a state in the heat exchanger can be determined, in particular a frozen state. Correspondingly, the controller can be further configured to receive a signal of the at least one first sensor and/or of the at least one second sensor and to determine whether the second fluid line of the associated heat exchanger is frozen.

In a further design variant, the gas dehumidification device can further comprise at least one collecting container for dehumidified gas which is fluidically coupled with an outlet of the second fluid line of at least one of the first heat exchanger and the second heat exchanger. As an alternative to this or in addition to it, the gas dehumidification device can comprise at least one collecting container for water which is fluidically coupled with an outlet for water of at least one of the first fluid line and second fluid line of at least one of the first heat exchanger and the second heat exchanger. The outlet for water (independently of which fluid line) can be an independent valve or another outlet point in the associated fluid line. As an alternative to this or in addition to it, the outlet for water can also be integrated into the corresponding fluid line at an inlet for fluid.

As an option, the outlet for water can be arranged at a position which forms the lowest point inside the gas dehumidification device in the subsequent installed state of the heat exchanger so that water (melted ice from the first and/or second fluid line) flows to the outlet for water as a result of gravity.

It is thus possible for the gas dehumidification device to be designed as an option in each design variant such that the melt water occurring during defrosting flows out of the respective heat exchanger as a result of gravitational force. In other words, the first and/or second fluid line is arranged such that it comprises a slope, as a result of which the melted ice flows away as a result of the force of gravity. For example, in the event of a helically formed heat exchanger, the spirals can comprise a pitch which enables the melt water to drain away.

According to a further aspect, a transport means includes a gas dehumidification device according to the first aspect and/or to one of the associated variants.

The designs, variants and aspects described here can additionally be combined in an arbitrary manner so that further design variants which are not described explicitly are included.

BRIEF DESCRIPTION OF THE DRAWINGS

Exemplary implementations of the invention are described in more detail below by way of the drawings.

FIG. 3 shows a schematic representation of a heat exchanger according to a further design variant, FIG. 4 shows a schematic representation of a first heat exchanger and second heat exchanger according to yet another design variant, FIG. 7 shows a schematic representation of a heat exchanger according to yet another design variant, FIG. 8 shows a schematic representation of a first heat exchanger and second heat exchanger according to a further design variant.

DETAILED DESCRIPTION OF THE PREFERRED EMBODIMENTS

According to the present invention, a gas dehumidification device selectively supplying a hot fluid into a first or second heat exchanger is described and in addition a transport means having such a gas dehumidification device is described.

Figure 1:
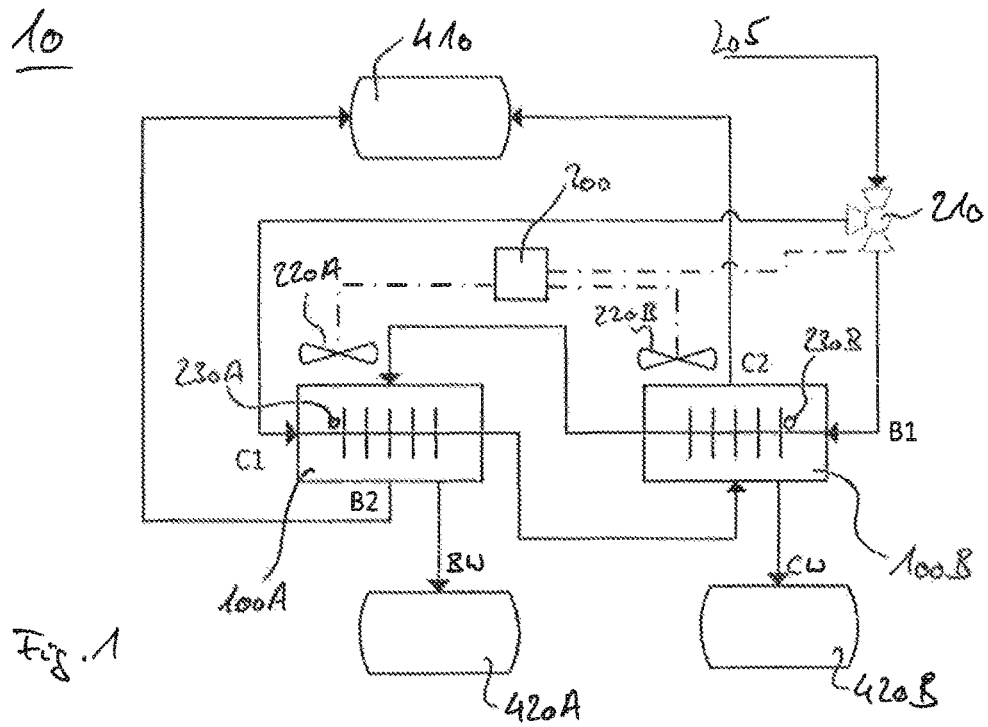
FIG. 1 shows a schematic representation of an overview of a gas dehumidification device.

FIG. 1 shows a schematic representation of an overview of a gas dehumidification device 10 which includes a first heat exchanger 100A and a second heat exchanger 100B. In this case, a gas to be dehumidified is run from a source 205 to a valve 210 of the gas dehumidification device 10. The valve 210 can assume two positions, wherein the gas to be dehumidified (or an arbitrary other fluid) is conducted to the first heat exchanger 100A in a first position, while being conducted to the second heat exchanger 100B in the second position of the valve 210. After traversing the first or second heat exchanger 100A, 100B, the fluid flows to the respectively other heat exchanger 100A, 100B and from there into a collecting container 410 for dehumidified gas.

Each of the first and second heat exchangers 100A, 100B is connected to a collecting container for water (420A, 420B) via a corresponding connection BW, CW. It is obviously also possible for one single common collecting container 420 for water to be provided. The collecting container 420 for water serves for receiving water which is condensed from the gas to be dehumidified in the respective heat exchanger 100A, 100B.

In addition, each heat exchanger 100A, 100B can have assigned thereto a conveying device 220A, 220B for the conveying of a coolant. The conveying device 220 enables the associated heat exchanger 100 to be flowed over with a coolant (not shown separately) which enables the gas to be dehumidified to be cooled inside the respective heat exchanger 100. Obviously, it is also possible to provide a single conveying device 220 and the volume flow of the coolant is conducted through another device, for example a valve or the like, to one of the two heat exchangers 100.

At least the valve 210 and, as an option, also the conveying device 220A, 220B or each of the conveying devices 220 can be actuated by a controller 200. The controller 200 can thus place the valve 210 into the first or second position of the two positions in order to set up a fluid flow (gas flow) from the source 205 to one of the heat exchangers 100. Correspondingly, the controller 200 can adjust a volume flow of the coolant through each of the conveying devices 220 (including stopping the coolant). For this purpose, the controller 200 can be optionally connected to a sensor 230A, 230B which is arranged in the respective heat exchanger 100A, 100B and provides a signal to the controller 200, as a result of which the controller 200 is able to determine whether a fluid line inside the respective heat exchanger 100 is frozen.

Figure 2:
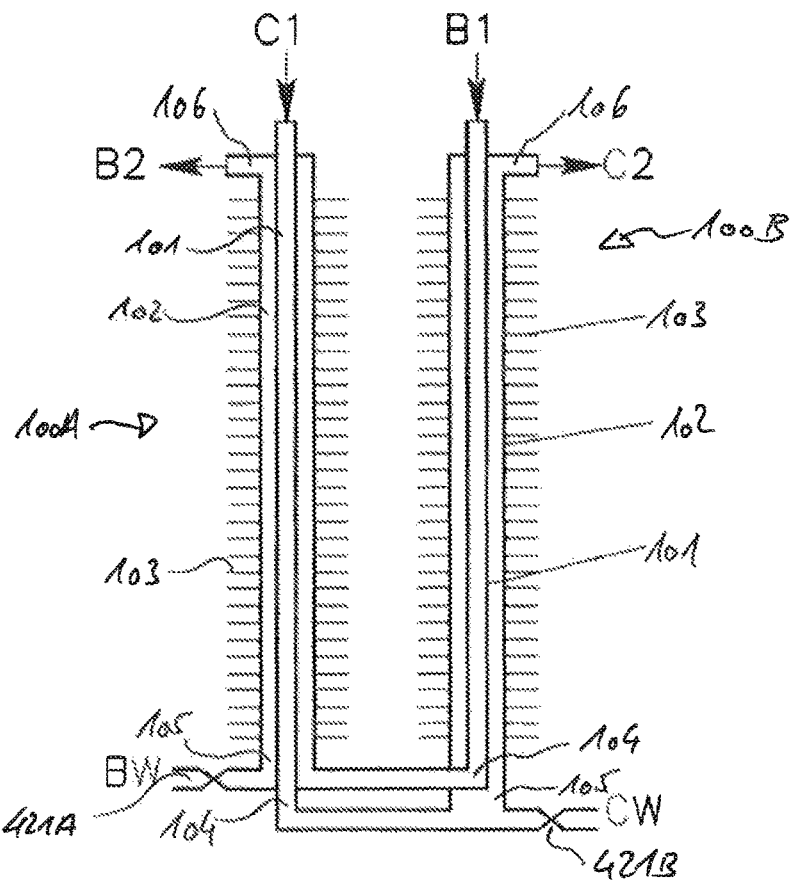
FIG. 2 shows a schematic representation of a first heat exchanger and second heat exchanger according to a design variant.

FIG. 2 shows a more detailed schematic representation of the first and second heat exchangers 100A, 100B according to a design. Each of the heat exchangers 100A, 100B comprises a first fluid line 101 and a second fluid line 102. In this case, the second fluid line 102 surrounds the first fluid line 101 at least in portions. For example, the first and second fluid lines 101, 102 can be two concentrically arranged pipelines. The first heat exchanger 100A is configured to thermally couple a fluid located in the second fluid line 102 with a first coolant on an outside surface of the second fluid line 102. Correspondingly, the second heat exchanger 100B is also configured to thermally couple a fluid located in the second fluid line 102 with a coolant on the outside surface thereof. For this purpose, the corresponding heat exchanger 100A, 100B can be provided with cooling ribs 103 or other objects which enlarge a surface of the outside of the second fluid line 102.

The heat exchangers 100A, 100B with their connections C1, C2 or B1, B2 correspond to the arrangement in FIG. 1. Consequently, a gas to be dehumidified can be introduced by means of the valve 210 either into the inlet C1 of the first fluid line 101 of the first heat exchanger 100A or into the inlet B1 of the first fluid line 101 of the second heat exchanger 100B.

In the design according to FIG. 2, the gas to be dehumidified, after traversing the first fluid line 101, passes via the outlet 104 of the first fluid line 101 of the respective heat exchanger 100 to an inlet 105 of the second fluid line 102 of the other heat exchanger 100. In other words, the outlet 104 and the inlet 105 are fluidically coupled. The fluidic coupling can be effected via a piece of fluid line or can be implemented as a result of a direct transition from outlet 104 to inlet 105.

The gas is dehumidified in the second fluid line 102 of the following heat exchanger 100 (for example after introduction of the gas to be dehumidified at C1, the gas passes into the inlet 105 of the second heat exchanger 100B and flows to the exit C2). This is effected by a cooling of the gas inside the second fluid line 102 of the second heat exchanger 100B by the coolant which is present on the outside surface of the fluid line 102. The cooling is accelerated by the cooling ribs 103. In order to attain a high degree of dryness, the gas is cooled below the freezing point of water. In this case, ice can be formed inside the second fluid line 102. There is an increased incidence of ice formation, in particular on the inside surface of the second fluid line 102 which is cooled by the coolant. In order to prevent the cross section of the second fluid line 102 of the second heat exchanger 100B completely freezing up and consequently the dehumidification coming to a standstill, the valve 210 switches over (for example on account of actuation by the controller 200). The gas to be dehumidified is then introduced at the inlet point B1 of the second heat exchanger 100B into the first fluid line 101 thereof. The fluid (gas) which is still hot heats the first fluid line 101 of the second heat exchanger 100B and consequently makes it possible for the second fluid line 102 of the second heat exchanger 100B to be defrosted. After leaving the outlet 104 of the first fluid line 101, the gas to be dehumidified is conducted into the second fluid line 102 at the inlet 105 thereof of the first heat exchanger 100A. There it can be cooled by means of the cooling ribs 103 and the coolant abutting against the outside surface and consequently dehumidified. The gas to be dehumidified leaves the first heat exchanger 100A at the outlet 106 of the second fluid line 102 (see outlet point B2). After the first heat exchanger 100A freezes, the valve 210 switches over again and the first above-described operation is repeated where the gas is dehumidified in the second heat exchanger 100B.

To remove the condensed water from the respective heat exchanger 100A, 100B, a first water outlet 421A and a second water outlet 421B are provided, for example at the inlet 105 of the respective second fluid line 102. They can be connected to the water collecting container 420 shown in FIG. 1.

The design variant of the gas dehumidification device 10 shown in FIG. 2 allows for a first operating mode where the two heat exchangers 100A, 100B are operated alternately. In other words, one heat exchanger 100A is used to dehumidify the gas, while another heat exchanger 100B is defrosted by the gas flowing in the first fluid line 101. Thus, only ever one path is traversed by the gas flow through the two heat exchangers 100A, 100B, i.e., either path B1-B2 or path C1-C2, as has been described with reference to FIG. 1. The defrosting of the corresponding heat exchanger 100 can be supported by controlling a conveying device 220 for the coolant, for example by reducing or shutting down a volume flow of the coolant.

In a second operating mode, both heat exchangers 100A, 100B are operated simultaneously, the defrosting operation being effected, in particular, by the controlling of the conveying device 220 for the coolant. In this connection, the same gas or two different gases can be dehumidified at the same time. In this case, the switchover and the valve 210, as has been described with reference to FIG. 1, are not necessary.

In the design variant shown in FIG. 3, the outlet 114 of the first fluid line 101 of a heat exchanger 100 is fluidically coupled with an inlet 105 of the second fluid line 102 of the same heat exchanger 100. In other words, the gas to be dehumidified flows from the inlet 117 of the first fluid line 101 through the first fluid line 101 and then after a reversal of the direction of flow from the inlet 115 of the second fluid line 102 to the outlet 116 thereof (see outlet point B2). It must be noted here that the outlet point B2 does not correspond to the outlet point B2 shown in FIG. 1 as it is arranged on the same heat exchanger 100.

In the case of the variant shown in FIG. 3, it is possible to use one single heat exchanger 100 which alternately dehumidifies gas and is then defrosted. The defrosting operation is effected, in this case, by reducing or shutting down a coolant volume flow. This corresponds to the above-described second operating mode with only one heat exchanger 100 and one gas to be dehumidified. As a result, a very simple design of the gas dehumidification device is certainly achieved. However, the temperature differences between coolant and the gas to be dehumidified are clearly more restricted in order to operate condensation and defrosting in a robust manner.

As an alternative to this, two of the heat exchangers shown in FIG. 3 can be connected in series and the gas to be dehumidified can always be conducted first of all in its hot state into the heat exchanger 100 which has to be defrosted. After leaving the heat exchanger 100 at the outlet 116 of the second fluid line 102, the gas is conducted into the further (for example second) heat exchanger 100. For this purpose, the outlet 116 of the second fluid line 102 is fluidically coupled with the inlet 117 of the first fluid line 101 of a further heat exchanger 100. The gas flowing in the further heat exchanger 100 is certainly still warm in the first fluid line 101 but has been cooled by the defrosting process in the previous heat exchanger 100. As a result, it can be dehumidified well in the second heat exchanger 100. A further valve, which fluidically couples the outlet 116 of the second fluid line 102 with the inlet 117 of the first fluid line 101 of the other heat exchanger 100 or with a collecting container 410 for dehumidified gas, is necessary in the case of this design variant. This valve is also able to be controlled by the controller 200 (FIG. 1).

The heat exchanger 100 comprises a water outlet 421 for the removal of the condensed-out water.

FIG. 4 shows a further design variant in which the gas to be dehumidified flows either only in the first fluid line 101 of the first and second heat exchangers 100A, 100B and is dehumidified or flows in the second fluid line 102 of both heat exchangers 100A, 100B and is dehumidified. As the connection points B1, B2 and C1, C2 correspond to those in FIG. 1, the gas to be dehumidified will flow always only in one of the two fluid lines 101, 102 of both heat exchangers 100. Here too, the gas to be dehumidified can first of all defrost a heat exchanger 100, while it is dehumidified in the other heat exchanger 100.

As condensed-out water occurs in both fluid lines 101, 102, each of the two fluid lines 101, 102 is also provided with a water outlet 421, 422. As an alternative to this, the fluid which flows through the connection points B1 and B2 through the respectively first fluid line 101, can also be a different fluid (liquid or gas) to the gas to be dehumidified. As a result, the water outlet 422 in the lower region 124 of the first fluid line 101 of the first heat exchanger 100A can be omitted. However, in this case, the gas to be dehumidified can only then be dehumidified between the connection points C1 and C2 when the defrosting operation by the fluid between the connection points B1 and B2 has been concluded. Consequently, continuous dehumidification of the gas is not possible. However, the use of a liquid which flows through the respective first fluid line 101, enables a greater heat flow from the respective first fluid line 101 into the respective second fluid line 102, as a result of which the defrosting operation is able to be strongly accelerated compared to the variant where gas flows through the respective first fluid line 101.

As an option, the unit shown in FIG. 4 (without the water outlet 422 (BW)) can also be duplicated and connected in series to the heat exchanger unit shown in FIG. 4. In other words, once the first fluid line (connection point B2) has been traversed, a fluidic coupling with the inlet point of the second fluid line (connection point C1) would be effected. As a result, the connection points B1, B2 and C1, C2 at the corresponding ends of the series-connected heat exchanger units would correspond to those in FIG. 1.

Figure 5:
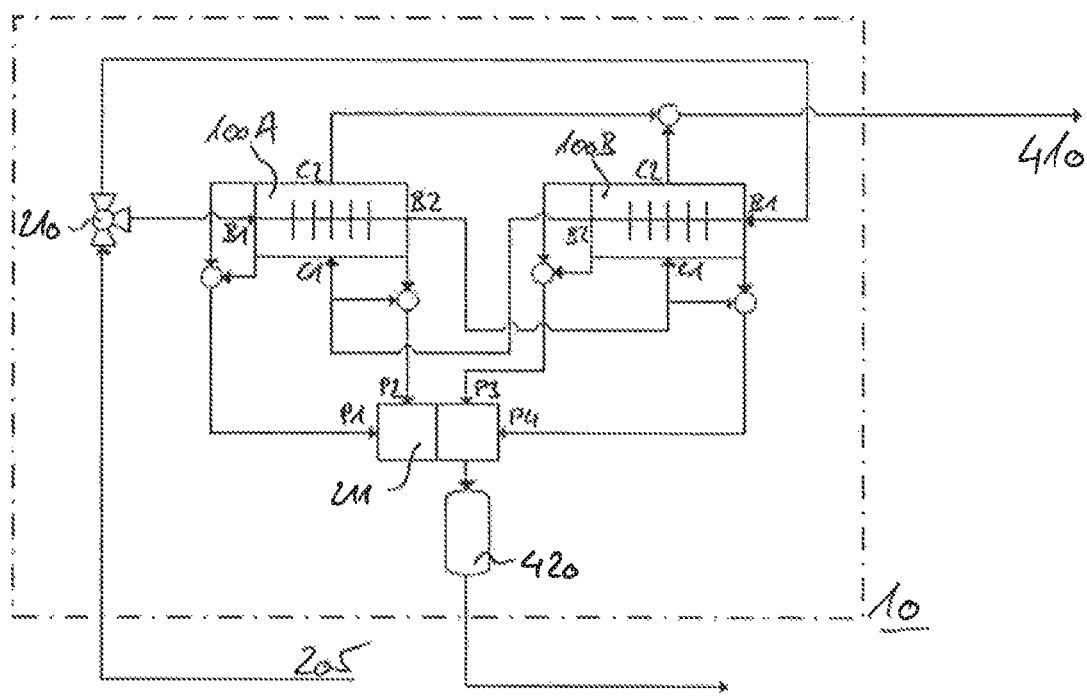
FIG. 5 shows a schematic representation of an overview of a further gas dehumidification device.

FIG. 5 shows a schematic representation of an overview of a further gas dehumidification device 10. The gas dehumidification device 10 corresponds to a large extent to the gas dehumidification device 10 in FIG. 1. Consequently, identical elements are provided with identical reference signs and the description thereof is not repeated here. In order to make FIG. 5 clearer, certain components, such as, for example the controller 200, the conveying devices 220 and sensors 230, have additionally not been shown although they can also be optional parts of the gas dehumidification device 10 shown in FIG. 5.

Each heat exchanger 100A, 100B can be provided with at least one drainage connection for condensation water or melt water. FIG. 5 shows in each case two drainage connections for condensation water or melt water which are joined together into one line. This is shown by circular junction elements in FIG. 5. The drainage connections summarized in this way are run to a second valve 211 where they are each connected to a valve connection P1, P2, P3 or P4. The valve 211 is configured to open only one drainage line path in each case. In other words, always only one drainage line is fluidically coupled with the collecting container 420 for water by the valve 211.

The valve 211 can be controlled by the controller 200 (see FIG. 1) so that the controller 200 performs the fluidic coupling of a valve connection P1, P2, P3 or P4 (that is to say, of a drainage line path) with the collecting container 420. As an alternative to this, the valve 211 can also be controlled independently. For example, the valve is able to rotate continuously so that each valve connection P1, P2, P3 or P4 is opened one after the other for a defined time window, i.e., is fluidically coupled with the collecting container 420 for water.

Figure 6:
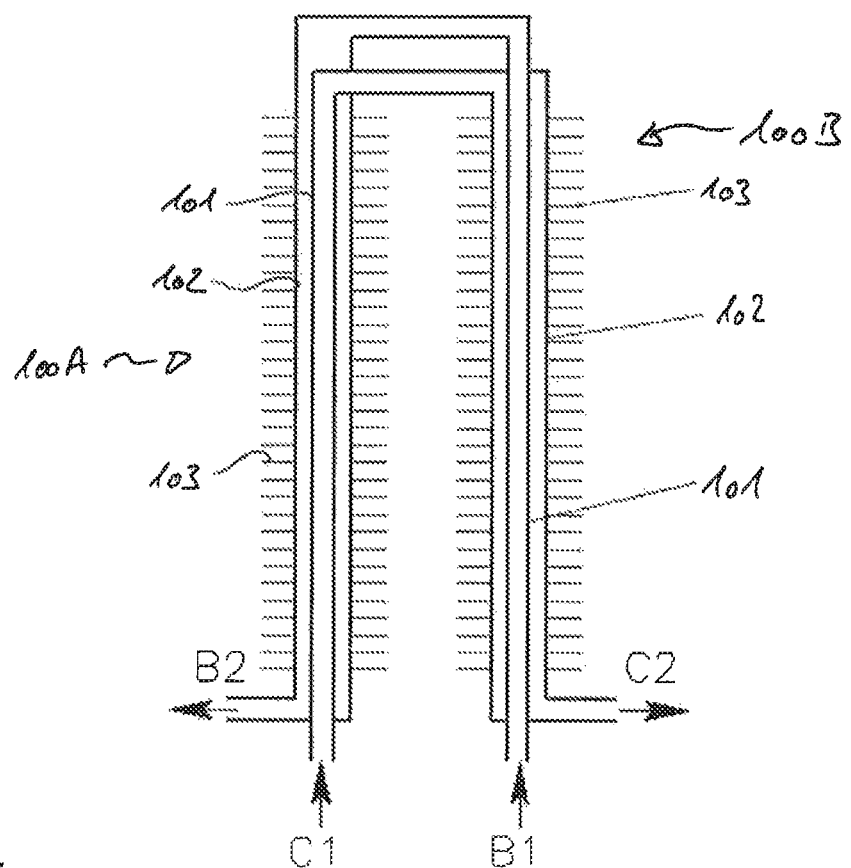
FIG. 6 shows a schematic representation of a first heat exchanger and second heat exchanger according to a further design variant.

FIG. 6 shows a schematic representation of a first heat exchanger 100A and second heat exchanger 100B according to a further design variant. The design variant from FIG. 6 corresponds to a large extent to the design variant from FIG. 2. Consequently, identical elements are provided with identical reference signs and the description thereof is not repeated here.

In contrast to the design variant in FIG. 2, in the design variant shown in FIG. 6, the heat exchangers 100A, 100B are arranged such that the connections B1, B2, C1 and C2 are located below. In particular, in the state installed in the gas dehumidification device 10, the connections B1, B2, C1 and C2 are located below. As a result, condensation water or melt water is conducted by means of gravity to the fluid connections B1, B2, C1 and C2 and can be drained there. Consequently, it is possible to dispense with the separate water outlets 421 (see FIG. 2) and the design of the heat exchangers 100A, 100B and of the entire gas dehumidification device 10 is able to be simplified. The water drainage, in this case, can be effected according to one of the gas dehumidification devices 10, as are shown in FIGS. 1 and 5.

FIG. 7 shows a schematic representation of a heat exchanger 100 according to yet another design variant. The heat exchanger 100 in FIG. 7 corresponds to a great extent to the heat exchanger 100 in FIG. 3. Here too, identical elements are provided with identical reference signs and are not described in order to avoid repetition. The fluid connections B1, B2 are arranged here, however, such that they are located below, as a result of which condensation water or melt water is able to be drained by means of the force of gravity. In particular, the condensation water or melt water occurs at the connection B2 and can be drained there.

FIG. 8 shows a schematic representation of a first heat exchanger 100A and second heat exchanger 100B according to a further design variant. The arrangement corresponds to a large extent to the arrangement in FIG. 4, identical elements being characterised with identical reference signs and not being described in order to avoid repetition. The fluid connections B1, B2, C1 and C2 are located below so that condensation water or melt water is able to drain as a result of the force of gravity. Here too, the design of the heat exchangers 100 and consequently of the gas dehumidification device 10 is simplified. The water connections 421, 422, in particular, (see FIG. 4) are not necessary.

Figure 9:
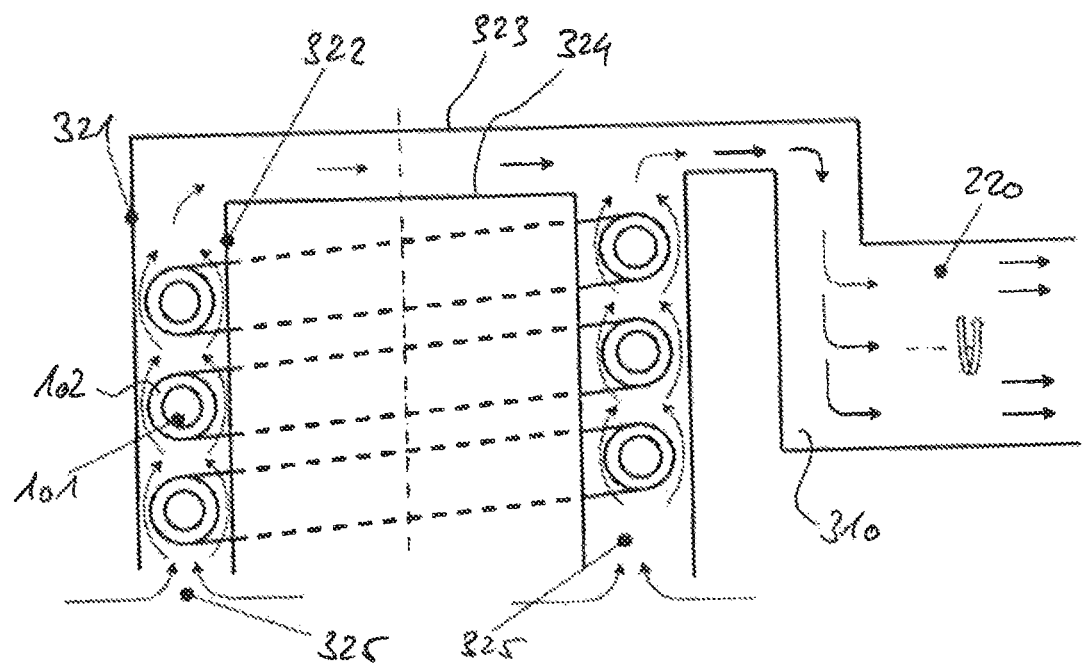
FIG. 9 shows a schematic representation of a coolant channel in which a heat exchanger is arranged as an example.

FIG. 9 shows a schematic representation of a coolant channel 310, in which a heat exchanger 100 is arranged as an example. The coolant channel 310 is formed, at least in one portion, from an outer cylinder 321 and an inner cylinder 322. The concentrically arranged cylinders 321, 322 form an annular gap in which the heat exchanger 100 can be arranged. For example, the first and second fluid lines 101, 102 of the heat exchanger 100 are helical, the spiral comprising a diameter which corresponds to a mean diameter of the air gap (annular gap).

It is obviously also possible for a second heat exchanger 100 to be arranged in the annular gap. In this case, the pitch, for example, of the spiral of a heat exchanger could be enlarged so that both spirals formed by the two heat exchangers can be arranged in one another. Thus, for example, in the sectional view shown in FIG. 9, each cross section of the first and second fluid lines 101, 102 would be assigned alternately to the first heat exchanger 100A and the second heat exchanger 100B.

The outer cylinder 321 can be closed at an end face 323 thereof. The inner cylinder 322 can also be closed at a corresponding end face 324, the two end faces 323, 324 being spaced apart from one another so that a flow channel for the coolant is formed. At least the outer cylinder 321 can be open on an opposite side so that the annular gap comprises a coolant inlet opening 325. A further portion of the coolant channel 310, in which, for example, a conveying device 222 is arranged, can ideally be connected to the closed end faces 323, 324.

As an alternative to this, the outer cylinder 321 can be open on both sides. As a result, the coolant can be moved by free convection, that is to say, without the aid of a conveying device 220. This simplifies the design of the gas dehumidification device 10 and reduces the production costs and the maintenance costs.

Even if the first and second fluid lines 101, 102 of the heat exchanger 100 are shown with circular (tubular) cross sections, they are able to comprise arbitrary cross sections. Thus, the second fluid line 102 can also comprise rectangular cross sections which are arranged on two sides of an equally rectangular cross section of the first fluid line. In other words, two (individual) second fluid lines 102 form a sandwich structure with the first fluid line 101.

Figure 10:
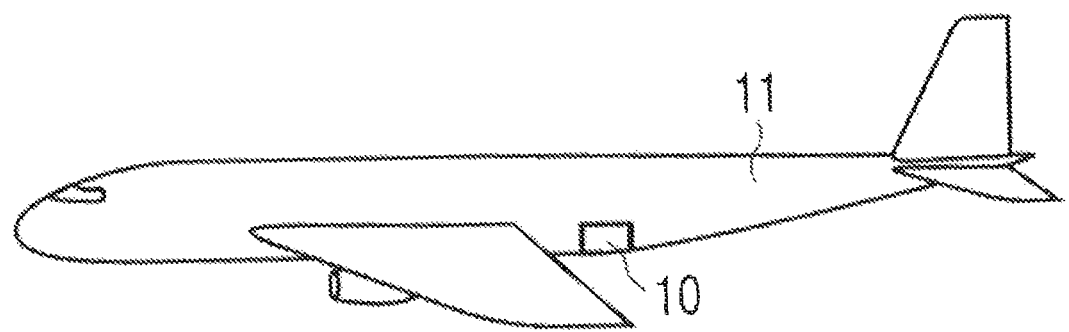
FIG. 10 shows a schematic representation of a transport means with a gas dehumidification device.

FIG. 10 shows a schematic representation of a transport means having a gas dehumidification device. Although the transport means is shown as an aircraft, it can also be a satellite or another passenger transport means and/or freight transport means, such as, for example, a bus, a train, an aircraft, a ship, etc.

The variants, designs and exemplary implementations discussed above serve simply to describe the claimed teaching but do not restrict it to the variants, designs and exemplary implementations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A gas dehumidification device, comprising:
a first heat exchanger including a first fluid line and a second fluid line, wherein the second fluid line surrounds the first fluid line at least in portions; and
a second heat exchanger including a first fluid line and a second fluid line, wherein the second fluid line surrounds the first fluid line at least in portions,
the first heat exchanger being configured to thermally couple a fluid located in the second fluid line of the first heat exchanger with a first coolant on an outside surface of the second fluid line of the first heat exchanger,
the second heat exchanger being configured to thermally couple a fluid located in the second fluid line of the second heat exchanger with a second coolant on an outside surface of the second fluid line of the second heat exchanger, and
a valve able to operate in two positions, wherein, in a first of the two positions, a fluid which comprises a higher temperature than at least one of the first or second coolant is conducted into the first fluid line of the first heat exchanger, and in a second of the two positions, the fluid is conducted into the first fluid line of the second heat exchanger; and
a controller configured to place the valve selectively into the first or second position.

2. The gas dehumidification device according to claim 1, further comprising:
at least one conveying device for at least one of the first and/or second coolant,
wherein the controller is further configured to convey the first coolant via the outside surface of the second fluid line of the first heat exchanger when the valve is placed into the second position, and to convey the second coolant via the outside surface of the second fluid line of the second heat exchanger when the valve is placed into the first position.

3. The gas dehumidification device according to claim 1, wherein an outlet of the first fluid line of the first heat exchanger is fluidically coupled with an inlet of the second fluid line of the second heat exchanger.

4. The gas dehumidification device according to claim 1, wherein an outlet of the first fluid line of the second heat exchanger is fluidically coupled with an inlet of the second fluid line of the first heat exchanger.

5. The gas dehumidification device according to claim 1, wherein an outlet of the first fluid line of the first heat exchanger is fluidically coupled with an inlet of the second fluid line of the first heat exchanger.

6. The gas dehumidification device according to claim 5, wherein an end of the first fluid line of the first heat exchanger, which forms the outlet of the first fluid line of the first heat exchanger, is completely surrounded by the second fluid line of the first heat exchanger and a direction of flow of a fluid flowing through the first fluid line is reversed in a region of the second fluid line of the first heat exchanger formed by the inlet of the second fluid line of the first heat exchanger.

7. The gas dehumidification device according to claim 5, wherein an outlet of the second fluid line of the first heat exchanger is fluidically coupled with an inlet of the first fluid line of the second heat exchanger.

8. The gas dehumidification device according to claim 1, wherein an outlet of the second fluid line of the first heat exchanger is fluidically coupled with an inlet of the second fluid line of the second heat exchanger.

9. The gas dehumidification device according to claim 8, wherein an inlet of the first fluid line of the first heat exchanger is fluidically coupled with an outlet of the first fluid line of the second heat exchanger.

10. The gas dehumidification device according to claim 2, further comprising a coolant channel, in or on which the at least one conveying device for at least one of the first or second coolant is arranged,
wherein at least one of the first heat exchanger or the second heat exchanger is arranged in the coolant channel.

11. The gas dehumidification device according to claim 10,
wherein the coolant channel comprises at least one portion of an outer cylinder and an inner cylinder which is arranged concentrically in the outer cylinder,
wherein at least one of the first heat exchanger or the second heat exchanger is formed in a helical manner, and
wherein at least one of the first heat exchanger or the second heat exchanger is arranged in an annular gap formed by the outer cylinder and the inner cylinder.

12. The gas dehumidification device according to claim 11, wherein the outer cylinder and the inner cylinder are each closed at a corresponding end face and at least the outer cylinder is open at a side located opposite the end face, and the annular gap formed by the outer cylinder and the inner cylinder forms a coolant inlet opening.

13. The gas dehumidification device according to claim 1, further comprising at least one of:
at least one first sensor, which is arranged in the first heat exchanger; or
at least one second sensor, which is arranged in the second heat exchanger;
wherein the controller is further configured to receive a signal of the at least one of the at least one first sensor or the at least one second sensor and to detect whether the second fluid line of the associated heat exchanger is frozen.

14. The gas dehumidification device according to claim 1, further comprising at least one of:
- at least one collecting container for dehumidified gas which is fluidically coupled with an outlet of the second fluid line of at least one of the first heat exchanger and of the second heat exchanger; or
- at least one collecting container for water which is fluidically coupled with an outlet for water of at least one of the first fluid line and second fluid line of at least one of the first heat exchanger and of the second heat exchanger.

15. A transport means which includes a gas dehumidification device according to claim 1.

16. The transport means according to claim 15, wherein the transport means comprise an airplane.

* * * * *